Nov. 21, 1961  J. W. RYAN  3,009,227
RELEASABLE FASTENER
Filed Jan. 13, 1959
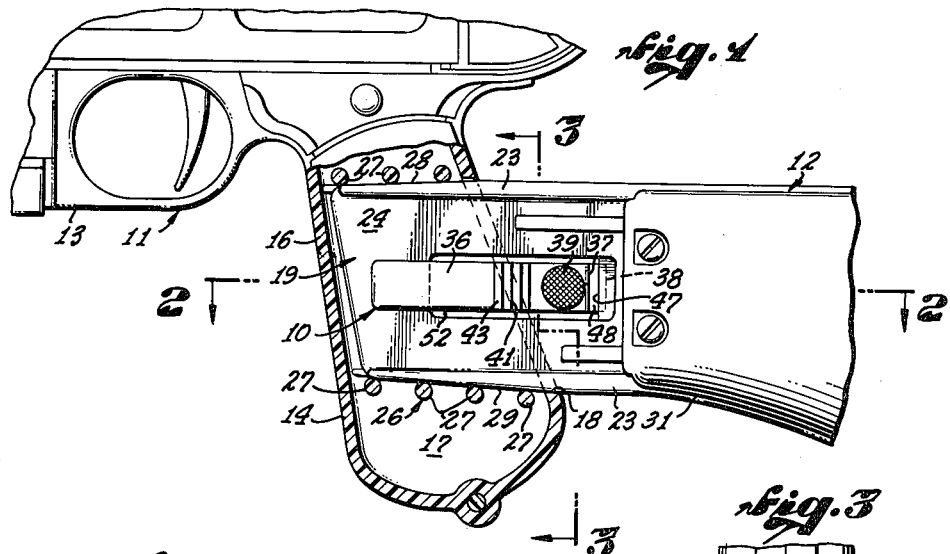
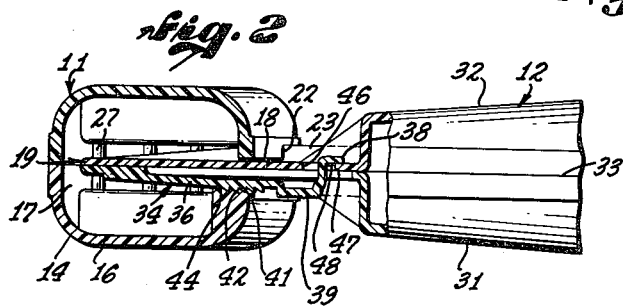
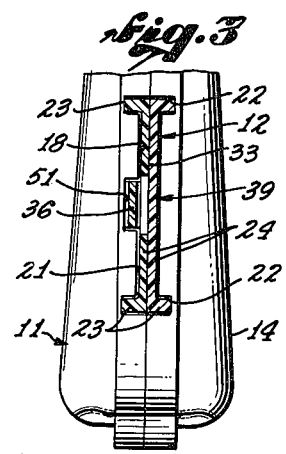
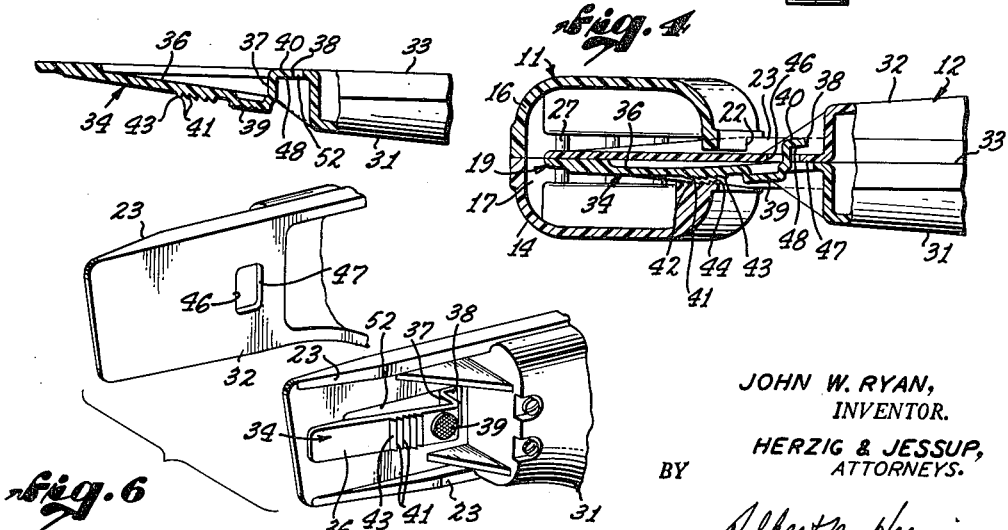
JOHN W. RYAN,
INVENTOR.
HERZIG & JESSUP,
BY  ATTORNEYS.

United States Patent Office 3,009,227
Patented Nov. 21, 1961

3,009,227
RELEASABLE FASTENER
John W. Ryan, 11027 Cashmere St., Bel Aire, Calif.
Filed Jan. 13, 1959, Ser. No. 786,607
2 Claims. (Cl. 24—206)

This invention relates to a releasable fastener and more particularly to a fastener for fastening one article to another by means of a portion of one of the articles coacting with a portion of the other of the articles.

In many applications, it is more practical and economical to form a fastener integrally with an article during molding of the article to reduce fabrication and assembly costs. However, latches integrally formed or molded on articles of resilient material, particularly plastics material, have had a high percentage of breakage when overstressed during use thereof, inasmuch as heretofore no provision has been made whereby movement of such fasteners can be limited to avoid overstress.

It is therefore an object of this invention to provide a new and improved releasable fastener for fastening a pair of articles which may be practically and economically formed integrally with one of the articles to resiliently and releasably fasten the article to another, and in which overstress is avoided.

This invention is particularly adaptable to articles which are pre-formed, as by molding, die-casting, or the like, in composite form, having at least a pair of halves cemented or otherwise secured in face-to-face relationship, whereby, in accordance with this invention, at latch means integrally formed with one of the halves coacting with a portion of the other of the halves to avoid overstress of the latch means while permitting sufficient resiliency and flexibility of the latch means to latch the article to another article when an end of the composite article is inserted into the other article to releasably secure the articles by engagement of the latch.

It is a further object of this invention to provide a new and improved releasable fastener which is economical to manufacture and capable of mass production and interchangeability of parts thereof.

Yet another object of this invention is to provide a new and improved releasable fastener of the character described which is easily and readily assembled and which does not necessitate the use of highly skilled labor.

This invention provides for a new and improved releasable fastener for a pair of articles, particularly molded or die-cast articles, at least one of which is composite, being formed of a pair of elements or halves secured together in face-to-face relationship, in which one of the elements includes a resilient latch means integral therewith and cooperating with a shoulder formed by an aperture of the other of the elements, whereby the latch may be flexed inwardly and resiliently biased outwardly to manually release the fastener, and the latch being normally urged into engagement with cooperating shoulders adjacent an opening of the other of the articles when an end of one of the articles having the latch thereon is inserted into the opening of the other article.

These and other objects of this invention will be more apparent from the following drawings, detailed description and appended claims.

In the drawings:

FIG. 1 is a side view, in elevation, of a pair of articles, releasably secured by a fastener designed and constructed in accordance with this invention, with parts broken away for greater clarity;

FIG. 2 is a horizontal, cross-sectional view as taken substantially along a line 2—2 of FIG. 1;

FIG. 3 is a vertical, cross-sectional view as taken substantially along a line 3—3 of FIG. 1;

FIG. 4 is a horizontal, cross-sectional view, similar to FIG. 2, illustrating release of the fastener;

FIG. 5 is a horizontal, cross-sectional view illustrating the latch means of one element of the composite article as it appears before it is secured to the other element thereof; and FIG. 6 is a fragmentary, perspective view showing portions of one of the articles thereof in exploded relationship.

Referring more particularly to the drawings, there is shown, by way of illustration but not of limitation, a releasable fastener generally designated by the numeral 10, designated and constructed in accordance with this invention, and herein illustrated as incorporated with a pair of articles 11 and 12 molded or otherwise formed of a resilient material such as plastics or the like.

Although the articles 11, 12 are herein illustrated as being a pistol and stock, respectively, the invention is not to be limited to such use inasmuch as the releasable fastener is adaptable to be used to secure a great variety of articles in a releasable manner. The pistol 11 is herein illustrated as having a body 13 having a depending handle or grip portion 14 integrally or otherwise formed therewith. The handle 14 is of a hollow construction having an outer wall 16 defining a chamber 17 within the handle 14. An opening 18 is formed in the rear portion of the wall 16 for receiving therethrough an end 19 of the stock 12. The opening 18 is non-circular and substantially complementary of the configuration, in cross-section, of the end 19.

The opening 18 is herein illustrated as having an I-shaped configuration including a narrow vertical portion 21 and transverse upper and lower portions 22, the transverse portions 22 having a sliding fit with outwardly-extending ribs 23 of the end 19 and the portion 21 having a sliding fit with the intermediate portions 24 of the end 19. The handle 14 is further provided with a guide means 26, in the form of a plurality of transverse pins 27, engageable with the upper and lower edegs 28, 29 respectively, of the end 19, when the end 19 is inserted through the opening 18. In this manner, the end 19, forming a tongue means on the article 12, is limited to longitudinal movement through the opening 18 transversely of the handle 14, the pins 27 preventing lateral movement of the end.

The article 12 is herein illustrated as being of composite form, that is, comprising a pair of opposite halves or elements 31 and 32 having outer surfaces of any desired configuration and substantially flat inner surfaces 33 secured together in face-to-face relationship, as by cementing or the like.

A latch means, generally designated by the numeral 34, is integrally formed on one of the elements, such as the element 31, and comprises a finger 36 inclined outwardly and having a transversely offset free end 37 including a hook 38. The inner face 40 of the hook 38 may be formed, as indicated in FIG. 5, substantially coplanar with the surface 33 of the element 31 when molded or die-cast, as indicated in FIG. 5. The latch 36 is relatively narrow and finger-like, and includes, on an inclined surface, a serrated or otherwise roughened finger piece 39 and teeth-like shoulder means 41 providing a plurality of shoulders for engagement with a plurality of oppositely-facing shoulders 42 formed integrally with or secured to the interior of the article 11, adjacent the opening 18. The teeth forming the shoulders 41 and 42 are preferably of the ratchet type having sloping surfaces 43 and 44, respectively, whereby the tongue or end 19 may be easily and quickly inserted through the opening 18, the surfaces 43 riding over the shoulders 44 until the shoulders 41 engage the shoulders 42. Withdrawal therefrom of the end 19 is resisted by virtue of the fact that the shoulders 41 are biased into abutment with the shoulders 42, the latch 36 being biased outwardly by the resiliency of the material of the element 31. The outer edges 28, 29 of the end 19 preferably taper to converge slightly at the forward end thereof to wedge between the guide means 26 whereby the end is inserted inwardly to abut the edges in wedging relationship with the guide means 26, there being a plurality of teeth on the end 19 cooperable with a plurality of teeth in the grip 14 to retain the end 19 immovably wedged in the guide means 26 until released. Turning movement of the end 19 in the opening 18 is prevented by the noncircular complementary configuration thereof.

To prevent overstressing of the latch 36, an aperture 46 is formed in the element 32 adjacent the hook 38 providing a shoulder 47 against which the outer surface 48 of the hook 38 abuts when the elements 31 and 32 are cemented together. Before cementing, the free end 37 is inserted through the opening 46, the hook 38 having such proportions that when the elements 31 and 32 are aligned for cementing the exterior surface 48 of the hook 38 overlies the shoulder 47, as best seen in FIG. 2. The latch 36 is thereby prevented from outward movement beyond the abutment of the hook surface 48 against the shoulder 47 to prevent overstressing of the latch 36 and thereby prevent breakage of the latch or permanent deformation thereof which occurs if the latch is stressed beyond its modulus of elasticity. The opening 18 is preferably provided with an extension 51, slightly larger than the width of the latch 36 for accommodation of the latch, as best seen in FIG. 3.

To release the fastener, i.e., the shoulders 41 from the shoulders 42, the latch 36 may be manually urged inwardly as by pressing a thumb or finger against the finger piece 39 to bend the latch inwardly and disengage the shoulders 41, 42 whereupon the end 19 may be easily manually withdrawn from the chamber 17 through the opening 18.

In this manner, a releasable fastener may be integrally or otherwise formed on one element of an article and having a free end cooperative with a portion of the other element of the article to prevent overstressing of the latch while still retaining a desired resiliency which is manually operable to release the latch and which is resiliently biased into automatically fastening the article to another article having operatively associated shoulder means for abutment with the latch, whereby the articles may be economically and rapidly manufactured by molding or diecasting methods. A U-shaped gap or space 52 circumjacent the latch 36 is formed during the molding process to form the resilient finger or latch 36 integrally with the element 31 whereas the shoulder 47 may be easily formed on the element 32 by merely providing the aperture 46 extending through the end thereof. It is to be understood that although the end 19 herein has been illustrated as being substantially reduced, the invention is not to be construed as limited to such configuration inasmuch as an article 12 having a uniform thickness appreciably greater than illustrated may be used by providing a longer offset portion adjacent the hook than herein illustrated.

While I have herein shown and described my invention in what I have conceived to be the most practical and preferred embodiments, it is recognized that departures may be made therefrom within the scope of my invention, which is not to be limited to the details disclosed herein but is to be accorded the full scope of the claims so as to embrace any and all equivalent devices and methods.

I claim:

1. A releasable fastener, for a pair of molded articles, at least one of which is composite and including a pair of elements secured together in face to face relationship, comprising: non-circular tongue means on said composite articles; resilient latch means on said tongue means comprising an integral finger means extending outwardly from an opening in said one element of said composite article and having a free end; shoulder means on the other of said elements and operatively associated with said free end of said latch means for limiting outward movement of said finger means when said composite article is disengaged from said other article; means defining an opening in the other of said articles and complementary to said tongue means, whereby said tongue means is insertable in said opening in said other article for joining said articles in interlocking relationship; and means operatively associated with said latch means and said other article for resisting withdrawal of said tongue means out of said opening, whereby manually imparted inward movement of said latch means releases said last mentioned means to permit manual withdrawal of said tongue means out of said opening.

2. A releasable fastener for a pair of articles, at least one of which is composite, being formed with a pair of elements secured together with interfaces in face to face relationship, comprising tongue means on one end of said composite article; resilient latch means on said tongue means and integral with one of said elements and having a free end; hook means on said free end; means defining an opening in the other of said elements and adjacent said free end, said free end residing in said opening with said hook means being biased against an outer surface of said other of said elements for limiting outward movement of said finger when said composite article is disengaged from said other article; means defining an opening in the other of said articles and complementary to said tongue means, whereby said tongue means is adapted to selectively reside in said last mentioned opening for joining said articles in interlocking relationship; and ratchet teeth means operatively associated with said latch means and said other of said articles for releasably securing said tongue means in said second opening, whereby manually imparted inward movement of said finger against the outward bias thereof disengages said ratchet teeth means to permit manual withdrawal of said tongue means out of said opening.

References Cited in the file of this patent

UNITED STATES PATENTS

| 318,369 | Gottstein | May 19, 1885 |
| 665,032 | Petway | Jan. 1, 1901 |
| 833,458 | Hausherr | Oct. 16, 1906 |
| 1,755,296 | Hiering | Apr. 22, 1930 |
| 2,884,214 | Wrobel | Apr. 28, 1959 |

FOREIGN PATENTS

| 62,682 | Germany | June 16, 1892 |
| 1,128,175 | France | Jan. 3, 1957 |